United States Patent
Hahn et al.

(10) Patent No.: US 6,805,546 B2
(45) Date of Patent: Oct. 19, 2004

(54) VACUUM ASSISTED MOLDING APPARATUS

(75) Inventors: Ron Brown Hahn, Temperance, MI (US); Kim Robert Hamner, Dearborn, MI (US)

(73) Assignee: ThyssenKrupp Budd Company, Troy, MI (US)

( * ) Notice: Subject to any disclaimer, the term of this patent is extended or adjusted under 35 U.S.C. 154(b) by 444 days.

(21) Appl. No.: 10/000,846

(22) Filed: Oct. 24, 2001

(65) Prior Publication Data

US 2003/0075840 A1 Apr. 24, 2003

(51) Int. Cl.[7] ............................................. B29C 43/56
(52) U.S. Cl. ........................ 425/405.1; 425/DIG. 60; 264/101; 264/102; 264/319; 264/320; 264/571
(58) Field of Search .................... 425/405.1, 405.2, 425/388, DIG. 60; 264/101, 102, 319, 320, 571

(56) References Cited

U.S. PATENT DOCUMENTS

| | | | |
|---|---|---|---|
| 2,841,823 A | * 7/1958 | Van Hartesveldt | 425/399 |
| 3,781,021 A | * 12/1973 | Thomson et al. | 277/631 |
| 4,447,373 A | * 5/1984 | Chappell et al. | 264/4 |
| 4,488,862 A | 12/1984 | Epel et al. | |
| 4,551,085 A | 11/1985 | Epel et al. | |
| 4,597,929 A | * 7/1986 | Blayne | 264/102 |
| 4,612,149 A | 9/1986 | Iseler et al. | |
| 4,855,097 A | 8/1989 | Iseler et al. | |
| 4,867,924 A | 9/1989 | Schilkey et al. | |
| 5,130,071 A | 7/1992 | Iseler et al. | |
| 5,370,521 A | 12/1994 | McDougall | |
| 6,264,454 B1 | 7/2001 | Hale | |

* cited by examiner

Primary Examiner—Stefan Staicovici
(74) Attorney, Agent, or Firm—Harness, Dickey & Pierce, P.L.C.

(57) ABSTRACT

Vacuum assisted molding apparatus provides reliable sealing about the mold cavity while minimizing the area of the plant floor space occupied by the mold. The apparatus includes an upper die, a lower die, a vacuum source, and a sealing assembly. The upper die includes a generally horizontal molding surface and vertically extending sides. The lower die includes a generally horizontal molding surface cooperating with the upper die to form a mold cavity. The sealing assembly is operable to create a vacuum surrounding the mold cavity.

14 Claims, 6 Drawing Sheets

VACUUM ASSISTED MOLDING APPARATUS

BACKGROUND OF THE INVENTION

This invention relates to molding of resin compounds and, more particularly, to molding apparatus and methods for making parts with quality surface finishes.

DISCUSSION

High quality surface finishes have long been provided by stamping panels from metal sheets. Stamping dies cut through the metal sheets and contour the panel into the desired shape. The surface finishes provided by such stampings are of sufficiently high quality that they can be painted by conventional techniques to provide aesthetically pleasing panels free from surface irregularities. Such panels are typically used as exterior body panels in the automotive industry. While these stamped body panels initially are characterized by quality surfaces such surfaces can be degraded over time through corrosion, rust and the like. Perhaps an even more serious drawback is the weight that these metal panels add to the total vehicle weight thus degrading fuel efficiency and lending itself to other problems due to increased weight in the vehicle.

To overcome some of these problems, panels made from lighter weight plastic composite material have been proposed and actually used in some vehicles. These plastic panels are generally manufactured by compressing a resinous compound between two dies in a mold. The Budd Company, the assignee of the present invention, has been a leader in providing high quality plastic panels made from sheet molding compound (SMC). Briefly, SMC is a compound or charge in the form of sheet-like material containing a thermosetting resin, reinforcing fibers, fillers and the like. The SMC charge is placed in the mold and compressed between heated dies to polymerize the resin and form the final part.

While plastic composite panels provide significant advantages over their metal counterparts, great care must be taken to ensure that the plastic composite panels have the same high quality surface finish. Trapped air in the charge can create surface imperfections such as pits, porosity or other surface blemishes. These surface imperfections can often be corrected by post-molding filling and sanding operations. However, such operations add to the manufacturing costs for such parts.

Therefore, it is an object of this invention to provide techniques for molding plastic composite panels with high quality surface finishes that require a minimum of post-molding operations.

It is a further object of this invention to provide other improvements to increase production efficiencies not only by increasing the quality of the parts made by a given mold but also by designing the molding equipment so that it is robust and reliable while at the same time minimizing its footprint, i.e., the space on the plant floor that the molding equipment must occupy.

SUMMARY OF THE INVENTION

These and other objects and advantages are provided by the vacuum assisted molding equipment and methods which will be described herein. In accordance with the teachings of this invention, molding equipment is designed so that it can create a significant vacuum in the mold cavity in a very short period of time and do so on a repeatable basis required under high volume production standards. Special attention has been given to the design of the sealing devices that seal off the molding cavity during each part cycle. The mold has also been designed to efficiently use plant floor space by optimizing the configuration of the molding equipment, especially the sealing devices.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The various advantages of the present invention will become apparent to those skilled in the art after reading the following specification and by reference to the drawings in which.

DETAILED DESCRIPTION OF THE PREFERRED EMBODIMENTS

The following specification describes the best mode currently known by the inventors for practicing their inventions. However, it should be understood that the scope of coverage of this patent is not limited to the specific example which will be described in some detail. For example, the invention will be described in connection with compression molding an SMC charge under heat and pressure. The various advantages of this invention, however, can be obtained by using other types of molding compounds requiring heat and pressure to form the final part. In addition, the term "compression molding" as used herein shall be construed in its broadest sense to cover any molding technique where a charge is compressed between dies to cause the resin to flow within the mold cavity and harden into the desired part shape before it is removed from the mold. Thus, the present invention may find utility in molding techniques sometimes referred to as transfer injection molding (TIM), resin transfer molding (RTM), reinforced reaction injection molding (RRIM) and structural reinforced reaction injection molding (SRIM). Therefore, the scope of protection for this invention will only be defined by the claims as properly construed.

Figure 1:
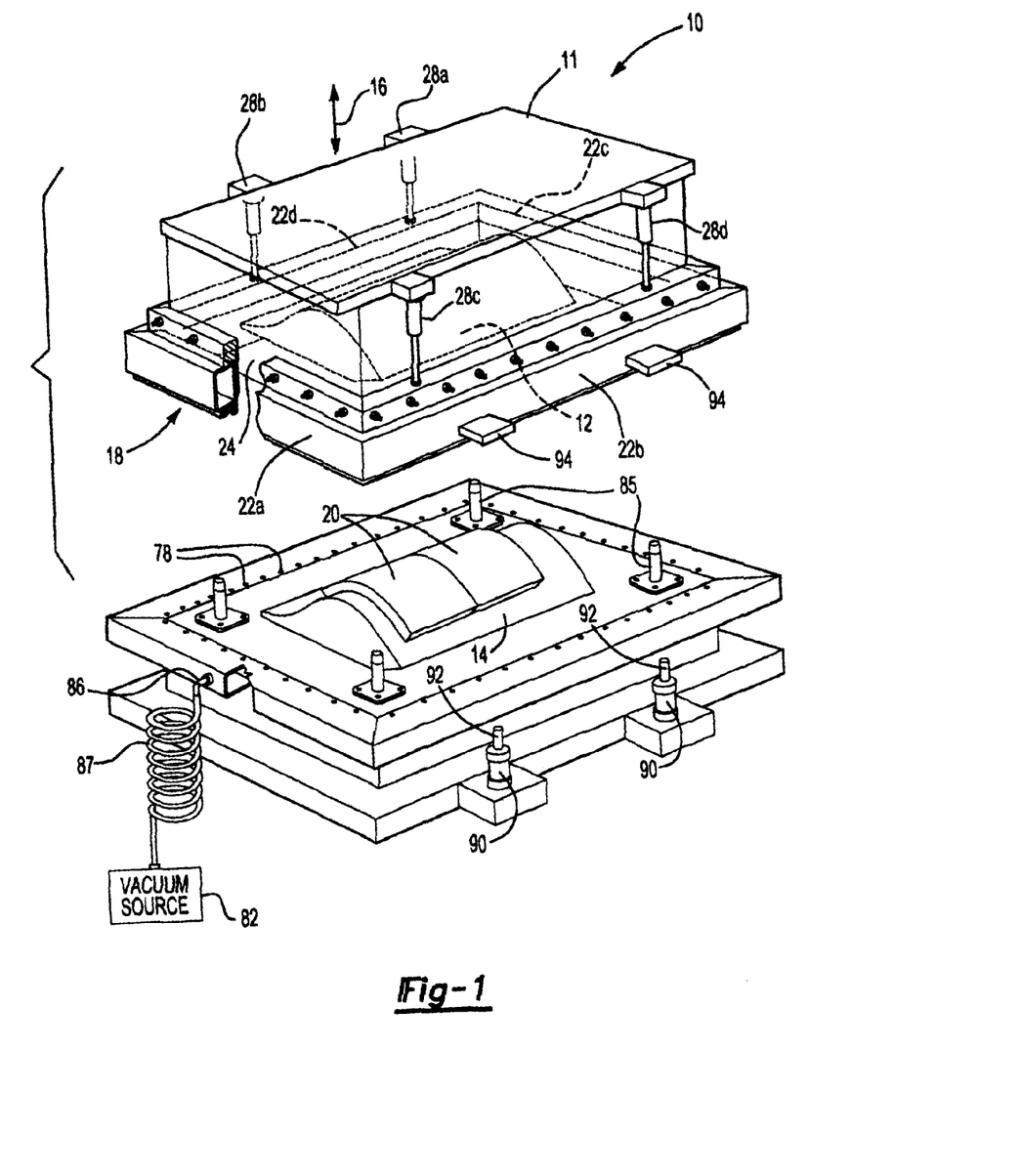
FIG. 1 is an exploded perspective view of a vacuum assisted mold made in accordance with the teachings of the present invention.

Turning now to FIG. 1, the mold 10 has a moveable upper portion including support plate 11 carrying a contoured upper die 12 and a stationary lower portion supporting complimentary shaped lower die 14. The upper portion moves vertically, up and down, under the force of a suitable hydraulic or pneumatic ram 16, as known in the art. When the ram 16 lowers the upper die 12 a sealing assembly 18 will create a seal surrounding the mold cavity defined by the upper and lower dies, 12 and 14. As will appear, a high level of vacuum will be created in the mold cavity in a very short period of time. All of this preferably occurs before the upper die 12 touches the charge 20 resting on the lower die 14. For ease of illustration, only two sheets of sheet molding compound (SMC) are illustrated in the drawings as the charge 20 to be molded. It should be understood, as noted before, that other types of resinous compounds can be used and that the number of charges and their orientations can be varied depending upon the part to be made.

Figure 2:
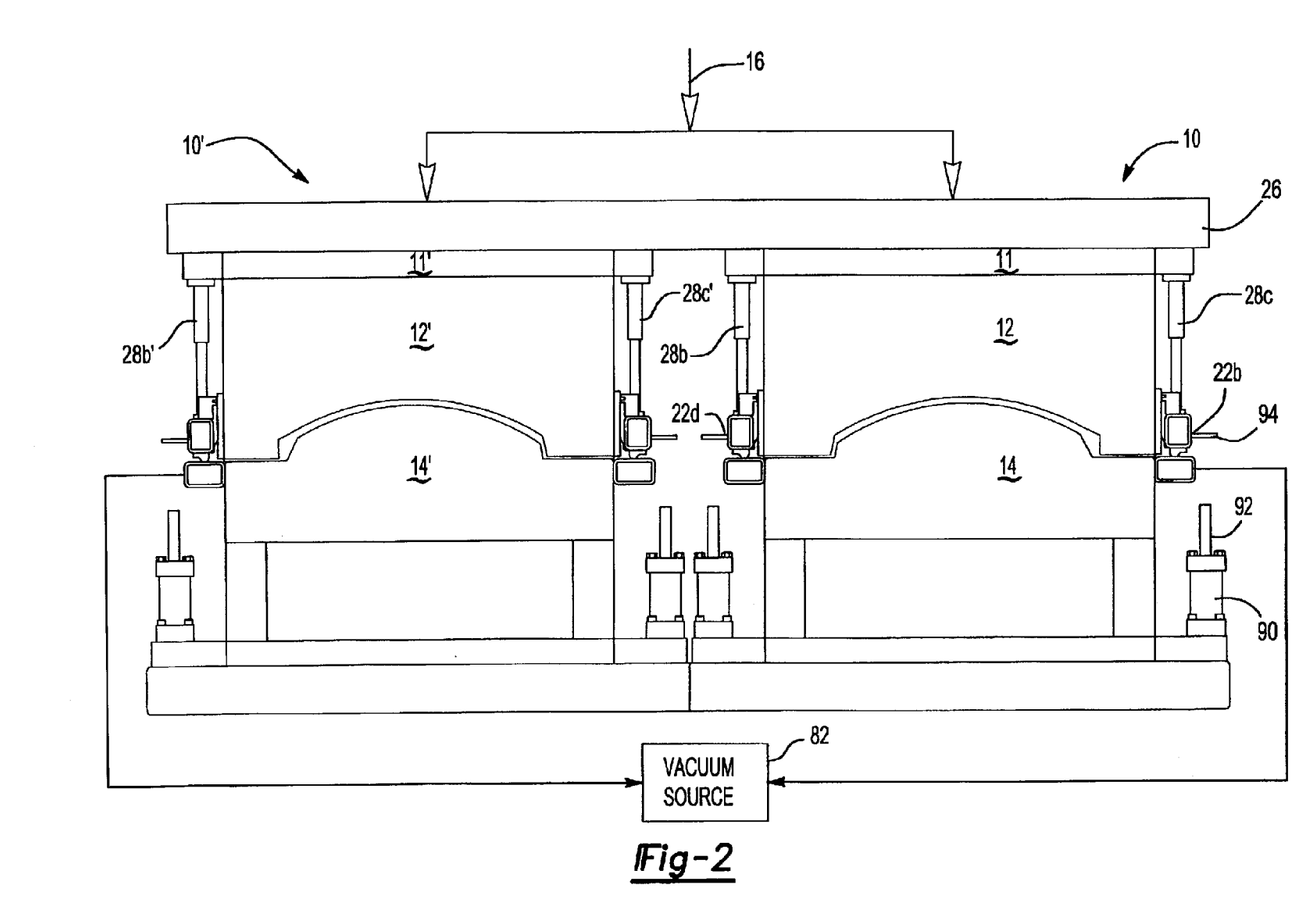
FIG. 2 is a side view showing two adjacent molds in a fully closed position.
Figure 3:
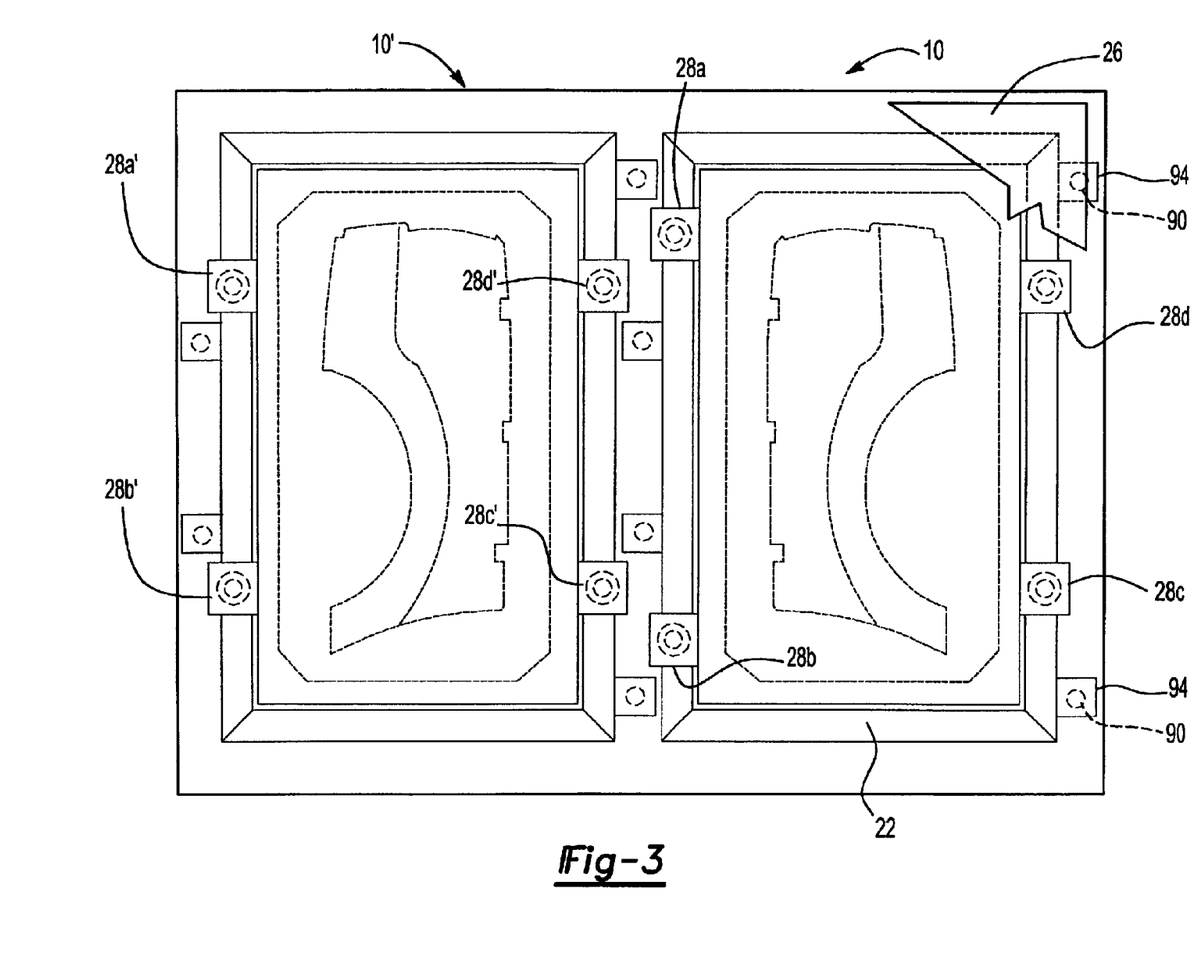
FIG. 3 is a top view of the molds.

The present invention focuses on the capability to provide a very high level vacuum in a very short period of time and to be able to do it reliably as mandated by high volume production standards, while at the same time minimizing floor space required in the molding plant facility. According to the teachings of this invention, several molds 10 can be placed side by side in order to optimize floor space, to share equipment and to permit an operator to work several molds at one time. For example, FIGS. 2 and 3 show two molds 10 and 10' located immediately adjacent one another on the floor of the plant. The molds 10 and 10' can be spaced as close as three feet and preferably, one foot from each other. As will appear, the ability to closely space the molds is due primarily to the design of the sealing assembly 18. As a result of the close spacing that is permitted by the present invention, a common press platen 26 can be used to bridge both of the molds 10 and 10'. The press platen 26 can be actuated by a common ram 16 such that the molds 10 and 10' operate simultaneously. As will appear, both mold 10 and 10' can also share a common vacuum source 82.

The sealing assembly 18 includes a box-like frame 22. The frame is constructed of four hollow rectangular tubes 22(a–d), each about 3 inch by 6 inch in cross section. Each end of the tubes is mitered at a 45° angle. The tubes are set upright, i.e., having their long sides generally paralleling the vertical outer sides 24 of the upper die 12. The mitered ends of the tubes 22(a–d) are welded together in a fixture or jig to form a one piece frame 22. Welding the frame, as compared to bolting it together, provides a more robust design which is less susceptible to leaks.

Upper ends of pneumatic cylinders 28 are mounted to outer edges of plate 11. Typically, there are four cylinders 28(a–d) for each mold. The lower portions of each cylinder rod are connected to the upper short side of frame 22. The cylinders 28 act as springs or shock absorbers. As will appear, when the sealing assembly 18 is not engaged with the lower portion of the mold, the cylinder rods are generally fully extended. However, when the mold is closed the rods of the cylinders retract to permit the sealing assembly 18 to rise upwardly as the remaining portion of the upper die assembly moves downwardly to a fully closed molding position.

As can be seen best in FIG. 3, the location of the cylinders 28(a and b) of mold 10 are offset from cylinders 28(c' and d') along the adjacent side of mold 10'. This offsetting of the cylinders enables the molds 10 and 10' to be spaced closer together. The sealing assembly 18 also is designed to facilitate this close spacing. This is one reason why the rectangular tubes making up frame 22 are set on ends with their long sides parallel in the sides 24 of the upper die 12, although other frame cross sections could be employed.

Figure 4:
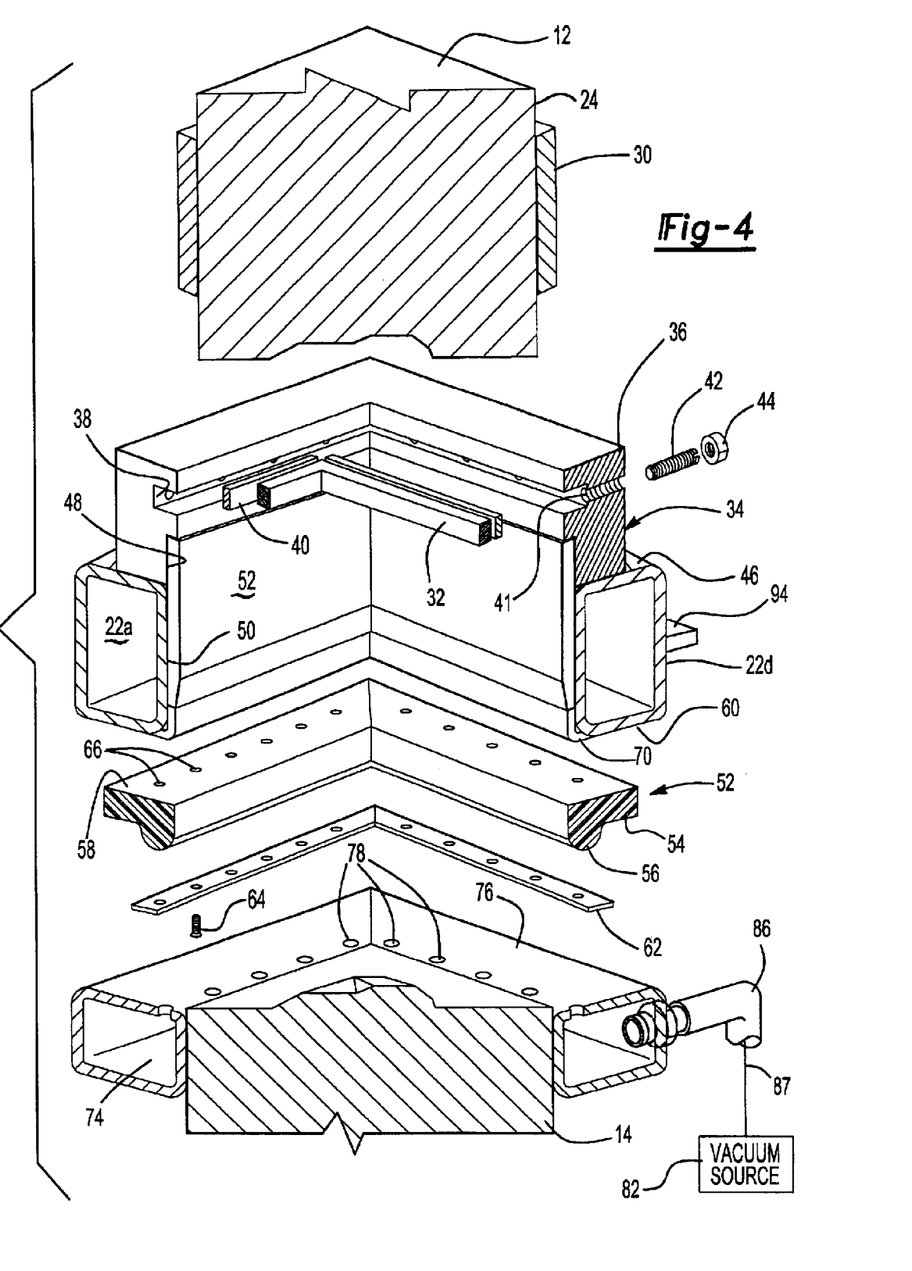
FIG. 4 is an exploded perspective view looking from the inside of the mold cavity outwardly towards a corner of the mold.
Figure 5:
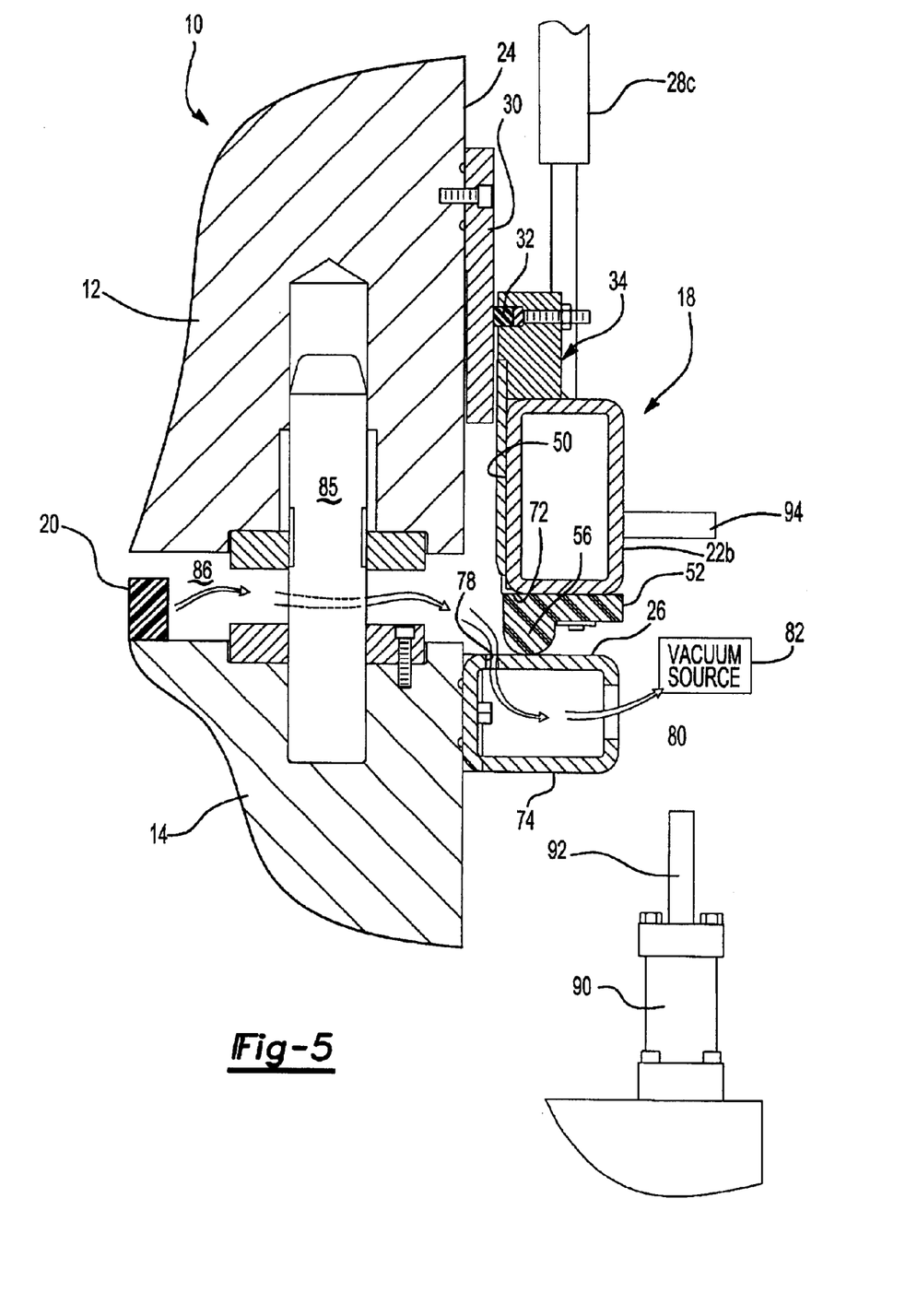
FIG. 5 is an enlarged partial cross sectional view illustrating the mold cavity being sealed so that a vacuum can be drawn before the dies fully compress the charge.
Figure 6:
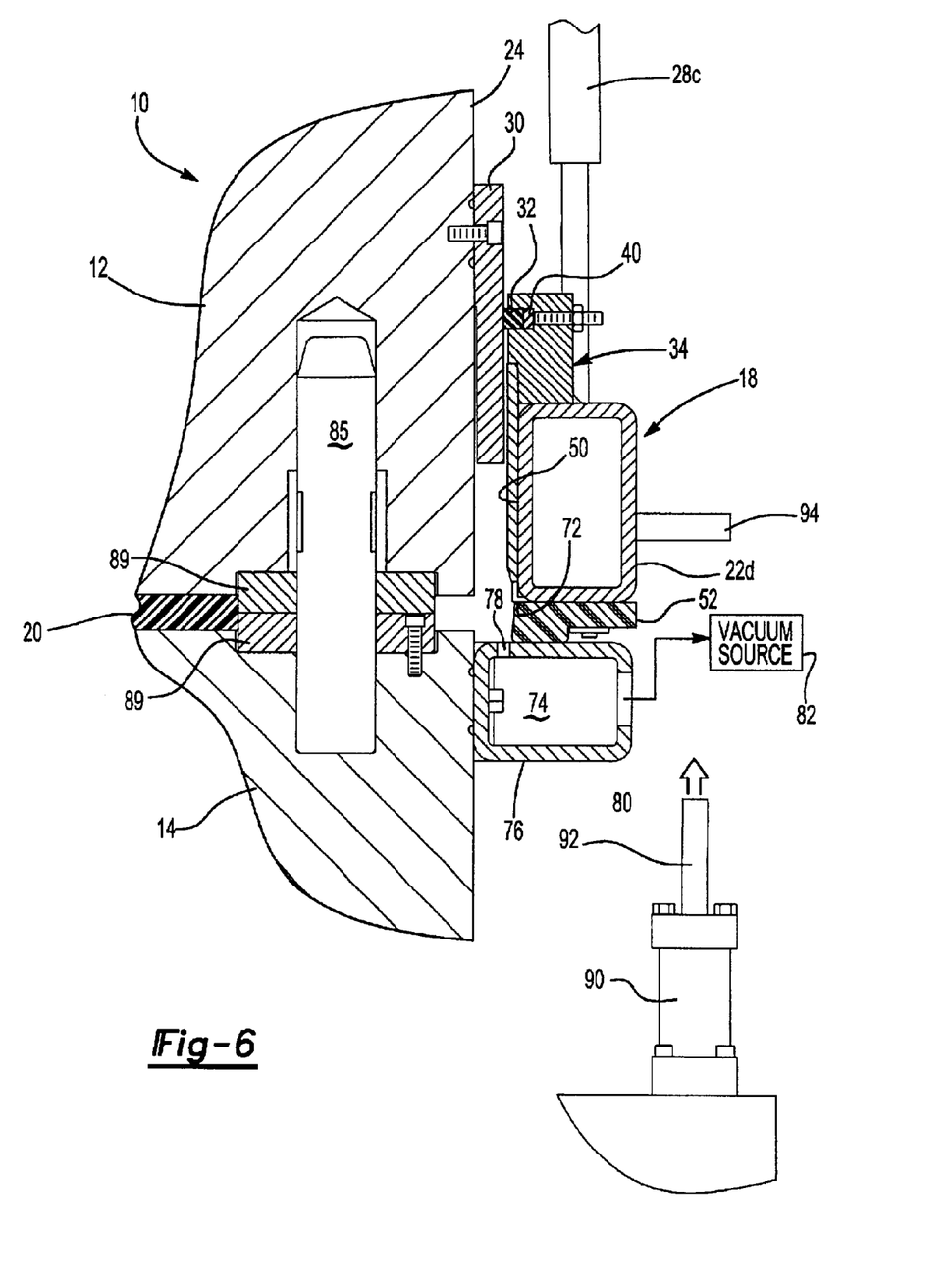
FIG. 6 is a view similar to FIG. 5 illustrating the mold in a fully closed position.

FIGS. 4–6 illustrate the sealing assembly 18 in greater detail. Working from the top to the bottom of these drawings, the exterior sides 24 of the upper die 12 include a plate 30 providing a smooth exterior surface. This surface is engaged by a wiper seal 32. Wiper seal 32 is in the form of a rope having a rectangular cross sectional area. Wiper seal 32 engages plate 30 on the exterior side 24 of the upper die 12. A wiper seal retainer 34 holds the wiper seal 32 in sealing engagement during operation of the mold 10 in a manner that eliminates distortion and simplifies its construction. Retainer 34 includes a solid one piece casing 36 which is cold rolled from steel.

An interior face of casing 36 includes a channel 38. Channel 38 receives the wiper seal 32 and metallic backing strips 40. Threaded holes 41 serve to receive threaded set screws 42. The pressure against which wiper seal 32 presses against plate 30 is adjusted by rotating set screw 42 which, in turn, presses against backing strips 40 thereby urging the wiper seal 32 inwardly towards plate 30. Nuts 44 hold the adjusted position in place. The entirety of the retainer 34 is fixed, e.g., welded, to the inner side of the top surface 46 of frame member 22.

The inner vertical side of casing 36 includes a cutout 48 presenting a vertical surface that is substantially aligned with the inner long side surface 50 of frame 22. A support plate 52 is fixed to the frame surface 50 and to the cutout 48 of the retainer casing 36. As will appear, the overall construction as described thus far simplifies the design for holding and adjusting the upper wiper seal 32, while at the same time providing a more reliable seal. For example, the one piece construction of the retainer casing 36 cooperates with the support plate 52 to prevent distortion when the high level of vacuum is created during the molding process. Such distortion, if not counteracted, could degrade the vacuum seal provided by way of wiper seal 32.

Attention will now be drawn to the lower sealing arrangement for sealing assembly 18. A P-shaped neoprene main seal 52 has a leg portion 54 and a bulbous inboard portion 56. The upper surface 58 has a horizontal dimension slightly larger than the horizontal dimension of the lower short side 60 of frame member 22. The main seal 52 is affixed to the surface 60 of frame member 22 by way of a bracket 62 and fasteners 64 passing through holes 66 in the bracket 62, seal 52 and into holes (not shown) in frame 22.

The main seal 52, as best shown in FIGS. 5 and 6, is situated on frame member 22 so that the inner vertical edge of bulbous portion 56 extends inwardly a short distance, e.g., about ½ inch, from the vertical wall 50 of frame member 22. However, this positioning of main seal 52 leaves an inner upper edge thereof free from support by the frame member surface 60. As a result, the bulbous portion 56 of the seal may have a tendency to ride upwardly when the tremendous vacuum is created during the molding process. This would create the unwanted condition of possibly breaking the seal about the mold cavity 86. Therefore, to counteract this problem, a ¾ inch L-shaped angle iron 70 is welded to the inner lower corner of frame member 22. The angle iron 70 presents a horizontal surface 72 which extends inwardly beyond the vertical inner edge of seal 52. The angle iron 70 is welded to the inner lower corner of frame 22. As a result, the angle iron 70 provides back pressure against the seal 52 to maintain a quality seal about the mold cavity 86.

Completing the sealing assembly 18, the lower die 14 includes a sealed hollow tubular structure 74 which is generally aligned with the frame 22. Structure 74 provides an upper surface 76 inner portions of which include a plurality of holes 78. An outer side of structure 74 includes a 3 inch diameter opening 80 containing a suitable fitting 84 for receiving a hose 87 connected to vacuum source 82. The vacuum source 82 must be capable of creating a very high level of vacuum in the mold cavity in a very short period of time so that the desired level of vacuum is created before the heated upper die 12 touches the charge 20. The level of vacuum should be at least 10 inches of mercury (Hg) and, preferably, the vacuum level should be at least 25 inches of Hg. In the preferred embodiment, the vacuum source 82 is provided by evacuating two 500 gallon drums with pumps and coupling the tanks, in series, to hose 87 through a suitable valving arrangement. Both molds 10 and 10' are preferably connected to the same vacuum source (FIG. 2) thereby sharing equipment and reducing costs.

The method of this invention will now be described. Referring to FIG. 1, the charge, here in the form of two SMC sheets 20, are placed by the operator onto the lower die 14 of mold 10. An operator may also place another charge onto the lower die of mold 10'. Then, the RAM 16 is actuated to move the upper die portions of molds 10 and 10' simultaneously downwardly towards the lower die 14.

The upper portions of the molds move downwardly until the mold cavity 86 is essentially defined but the upper die 12 remains spaced from the charge 20 as shown in FIG. 5. At this time the bulbous portion 56 of seal 52 makes the seal with the upper portion 76 of structure 74. Concurrently, wiper seal 32 maintains its seal between the sealing assembly 18 and the upper die 12 by its wiping action on plate 30. Thus, seals 32 and 52 create a vacuum chamber surrounding the mold cavity which is generally designated by the numeral 86 in FIG. 5. At this time, valves (not shown) are opened to connect the vacuum source 82 through hose 87 to hollow structure 74 to create the desired level of vacuum within the mold cavity 86 very quickly as noted herein. Referring to FIG. 5, air within the mold cavity 86 passes through holes 78 in structure 74, through the hollow interior of structure 74 and out through opening 80 and, thence, through the hose 87 to the vacuum source 82. As shown in FIG. 5, the vacuum is created before the upper die 12 contacts the charge 20.

Further movement of the RAM 16 causes the upper die 12 to move downwardly to the fully closed position as shown in FIG. 6. The alignment of the upper die 12 and lower die 14 is facilitated by pins 85 and stops 89. At this point, the sealing assembly 18 actually moves upwardly slightly, with the cylinder rods retracting. However, the wiper seal 32 and main seal 52 continue the seal about the mold cavity 86. When the mold is fully closed, the heated upper and lower dies 12, 14 compress the charge 20 so that it flows and fills the mold cavity 86.

It has been discovered that the creation of the vacuum within the mold cavity 86 significantly decreases surface imperfections thereby providing the resulting part with a smooth surface finish, sometimes referred to in the art as a Class A finish rivaling that of a stamped steel counterpart. While the phenomena is not completely understood, it is believed that the high level of vacuum removes trapped air within the charge 20 that could otherwise cause blistering, pits, porosity or other surface imperfections. Preferably, as noted above, the level of vacuum should be created before the upper die touches the charge 20. Otherwise, discoloration and surface blemishes may occur. The short period of time in which the vacuum is created is also normally important. Not only does this ensure that the cycle time is optimized but the fast vacuum creation time also seems to lead to better quality parts. The vacuum creation time is measured from the point at which the main seal 52 seals against structure 74 thereby defining a vacuum chamber about the mold cavity 86 (see, FIG. 5).

After an appropriate period of time where the resin within the charge 20 polymerizes, the RAM 16 is actuated to lift the upper die assembly. It will be appreciated, however, that a high level of vacuum remains within the mold cavity which will resist movement of the upper die assembly. In order to increase the throughput of the mold by decreasing cycle time, kicker cylinders 90 activate their rods 92 upwardly to push or "kick" against extending arms 94 of the sealing assembly 18. This action moves the sealing assembly 18 upwardly to break the seal created by main seal 52. Accordingly, the vacuum within the mold cavity 86 is relieved and the RAM 16 can more easily raise the upper die assembly so that the part can be removed from the mold.

From the foregoing description, those skilled in the art will now appreciate that the present invention provides a robust mold design that minimizes downtime in high volume production. The overall mold construction lends itself to a small footprint in the molding plant thereby allowing adjacent molds to be spaced close together and actuated by common components, such as RAM 16 and vacuum source 82.

The description of the invention is merely exemplary in nature and, thus, variations that do not depart from the gist of the invention are intended the invention. Such variations are not to be regarded as a departure from the spirit and scope of the invention.

The following U.S. patents are hereby incorporated by reference: U.S. Pat. No. 4,488,862 issued Dec. 18, 1984; U.S. Pat. No. 4,612,149 issued Sep. 16, 1986; U.S. Pat. No. 4,855,097 issued Aug. 8, 1989; U.S. Pat. No. 4,551,085 issued Nov. 5, 1985; U.S. Pat. No. 5,130,071 issued Jul. 14, 1992; U.S. Pat. No. 4,867,924 issued Sep. 19, 1989; U.S. Pat. No. 5,370,521 issued Dec. 6, 1994; U.S. Pat. No. 4,535,110 issued Aug. 13, 1985 and U.S. Pat. No. 4,622,354 issued Nov. 11, 1986.

What is claimed is:

1. Apparatus for molding parts comprising:
    an upper die having a generally horizontal molding surface and vertically extending sides;
    a lower die having a generally horizontal molding surface cooperating with the upper die to form a mold cavity;
    a vacuum source; and
    a sealing assembly for creating a vacuum chamber surrounding the mold cavity, said sealing assembly including;
    a first member located adjacent the sides of the upper die, said first member being a generally rectangular tube having long sides thereof generally paralleling the sides of the upper die, said first member having upper and lower short sides;
    a generally hollow second member fixed laterally adjacent the lower die and vertically aligned with the first member;
    a flexible seal on one of the members; and
    a device located adjacent inboard portions of the first member and the seal for restricting movement of the seal when the vacuum source is activated to create a vacuum in the vacuum chamber thereby maintaining sealing engagement between the upper and lower members.

2. The apparatus of claim 1 wherein the seal is located on the lower short side of the first member.

3. The apparatus of claim 2 wherein the seal is a generally P-shaped body having a bulbous portion and a leg portion.

4. The apparatus of claim 3 wherein the device is an L-shaped angle iron on an inboard lower corner of the first member above the bulbous portion of the seal.

5. The apparatus of claim 3 which further comprises:
a plate for securing the leg portion of the seal to the lower short side of the first member.

6. The apparatus of claim 5 wherein the bulbous portion of the seal is located inboard of the leg portion.

7. The apparatus of claim 6 wherein the bulbous portion of the seal extends inwardly beyond an inner long side of the first member and the device is located on the first member above an inner side of the bulbous seal portion.

8. The apparatus of claim 1 wherein the first member is a frame constructed of rectangular tubes having mitered corners welded together to form a generally one-piece construction.

9. The apparatus of claim 1 wherein the sealing assembly further comprises a second sealing assembly for making a sliding seal between the first member and the sides of the upper die.

10. The apparatus of claim 9 wherein the second sealing assembly comprises:
a solid body affixed to the upper side of the first member, with an inboard face of the body a channel for receiving a wiper seal therein.

11. Apparatus for molding parts comprising:
an upper die having a generally horizontal molding surface and vertically extending sides;
a lower die having a generally horizontal molding surface cooperating with the upper die to form a mold cavity;
a vacuum source; and
a sealing assembly for creating a vacuum chamber surrounding the mold cavity, said sealing assembly including;
a first member located adjacent the sides of the upper die, said first member being a generally rectangular tube having long sides thereof generally paralleling the sides of the upper die and having upper and lower short sides;
a generally hollow second member fixed laterally adjacent the lower die and vertically aligned with the first member;
a flexible seal located on the lower short side of the first member having a generally P-shaped body including a bulbous portion and a leg portion; and
an L-shaped angle iron located adjacent an inboard lower corner of the first member and above the bulbous portion of the seal for restricting movement of the seal when the vacuum source is activated to create a vacuum in the vacuum chamber thereby maintaining sealing engagement between the upper and lower members.

12. Apparatus for molding parts comprising:
an upper die having a generally horizontal molding surface and vertically extending sides;
a lower die having a generally horizontal molding surface cooperating with the upper die to form a mold cavity;
a vacuum source; and
a sealing assembly for creating a vacuum chamber surrounding the mold cavity, said sealing assembly including:
a first member located adjacent the sides of the upper die, said first member being a generally rectangular tube having long sides thereof generally paralleling the sides of the upper die and having upper and lower short sides;
a generally hollow second member fixed laterally adjacent the lower die and vertically aligned with the first member;
a flexible seal located on the lower short side of the first member having a generally P-shaped body including a bulbous portion and a leg portion;
an L-shaped angle iron located adjacent an inboard lower corner of the first member and above the bulbous portion of the seal for restricting movement of the seal when the vacuum source is activated to create a vacuum in the vacuum chamber thereby maintaining sealing engagement between the upper and lower members; and
a plate for securing the leg portion of the seal to the lower short side of the first member.

13. The apparatus of claim 12 wherein the bulbous portion of the seal is located inboard of the leg portion.

14. The apparatus of claim 13 wherein the bulbous portion of the seal extends inwardly beyond an inner long side of the first member and the L-shaped angle iron is located on the member above an inner side of the bulbous seal portion.

* * * * *